(12) United States Patent
Swift

(10) Patent No.: US 10,993,792 B2
(45) Date of Patent: May 4, 2021

(54) MILL BLANK INVENTORY MONITORING AND DISPENSING SYSTEM

(71) Applicant: Ronald L Swift, Medina, MN (US)

(72) Inventor: Ronald L Swift, Medina, MN (US)

( * ) Notice: Subject to any disclaimer, the term of this patent is extended or adjusted under 35 U.S.C. 154(b) by 111 days.

(21) Appl. No.: 16/396,369

(22) Filed: Apr. 26, 2019

(65) Prior Publication Data

US 2020/0337817 A1 Oct. 29, 2020

(51) Int. Cl.

| | |
|---|---|
| *A47B 88/00* | (2017.01) |
| *A61C 19/02* | (2006.01) |
| *A47B 88/988* | (2017.01) |
| *A47B 88/90* | (2017.01) |
| *A47B 88/994* | (2017.01) |
| *A61C 13/00* | (2006.01) |

(52) U.S. Cl.
CPC .............. *A61C 19/02* (2013.01); *A47B 88/90* (2017.01); *A47B 88/988* (2017.01); *A47B 88/994* (2017.01); *A61C 13/0022* (2013.01)

(58) Field of Classification Search
CPC . A47F 3/14; A47F 3/063; A47F 7/024; A47B 88/90; A47B 88/994; A61C 19/02
See application file for complete search history.

(56) References Cited

U.S. PATENT DOCUMENTS

| | | | |
|---|---|---|---|
| 1,035,153 A | 8/1912 | Candy | |
| 1,452,242 A | 3/1922 | Jensen | |
| 1,754,128 A * | 4/1930 | Thompson | A47B 81/00 312/209 |
| 2,333,717 A | 12/1940 | Heed et al. | |
| 2,528,219 A | 10/1950 | Feagin | |
| 2,964,371 A * | 12/1960 | Todd | A47F 3/063 312/234.5 |
| 4,799,588 A * | 1/1989 | Trisl | A47F 7/024 206/301 |
| 4,807,760 A * | 2/1989 | Sussman | A47B 87/00 206/581 |
| 5,628,405 A * | 5/1997 | Price | A47F 7/024 206/561 |
| 5,711,435 A * | 1/1998 | Morison | A47F 5/08 211/90.01 |
| 8,056,740 B2 * | 11/2011 | Weshler | A47F 7/286 211/119.003 |
| 8,186,522 B2 * | 5/2012 | Weshler | A47F 7/024 211/119.003 |
| 8,579,125 B2 * | 11/2013 | Trinh | A47F 7/286 211/74 |
| 8,607,970 B2 * | 12/2013 | De Lecce | A47F 7/024 206/6.1 |

(Continued)

*Primary Examiner* — Kimberley S Wright
(74) *Attorney, Agent, or Firm* — David Johnson

(57) ABSTRACT

A storage cabinet (1) that may be used to store CAD/CAM milling blanks (45) such as those used in dentistry. Drawers or box assemblies (3) are placed on shelves (4) within the cabinet (1). Each box assembly (3) includes a forward compartment (15) which includes a lower cavity (16). Perforations (17) in the top surface (20) of the forward compartment permit a spindle retaining assembly (23) within the cavity (16) to grip the spindle or shaft (46) of a blank which may be readily viewed and removed by a user as needed. The retaining assembly (23) includes an orthogonal groove (32) that is biased by a spring (29) in order to permit spindles of various sizes and geometries to be retained.

9 Claims, 7 Drawing Sheets

(56) References Cited

U.S. PATENT DOCUMENTS

| | | | |
|---|---|---|---|
| 9,307,847 B2* | 4/2016 | De Lecce | A47F 3/14 |
| 2009/0294390 A1* | 12/2009 | Weshler | A47F 7/286 |
| | | | 211/119.003 |
| 2012/0037578 A1* | 2/2012 | Weshler | A47F 7/024 |
| | | | 211/59.3 |
| 2012/0132546 A1* | 5/2012 | De Lecce | A47F 7/024 |
| | | | 206/6.1 |
| 2013/0299363 A1* | 11/2013 | De Lecce | A47F 3/14 |
| | | | 206/6.1 |
| 2019/0231467 A1* | 8/2019 | Grimsley | G01G 19/52 |

* cited by examiner

MILL BLANK INVENTORY MONITORING AND DISPENSING SYSTEM

FIELD OF THE INVENTION

The present invention pertains generally to the field of dental implant materials, and more particularly to a dental mill blank storage and retrieval system.

DESCRIPTION OF RELATED TECHNOLOGY

Modern dentistry includes manufacturing processes that are used to create, shape and size a replacement tooth, crown, inlay or other tooth related item. The tooth or other item is formed from a solid rectangular blank of a synthetic composite material. These manufacturing processes are highly automated and are performed within the confines of a dental office while the patient is present. Modern computer based technology permits an original tooth or portion thereof to be scanned, characterized and then converted into a usable computer model. Automated milling machines are capable of converting the computer model into a finished tooth or related item that can be permanently implanted into the mouth of a patient, all of this occurring during a single office visit.

The initial step of manufacturing a replacement tooth or other item is for a dentist or a member of her staff to retrieve a milling blank from a storage area. Milling blanks are not homogeneous and have many characteristics such as material type, color, size, shape and cost. In a typical dental office, the number of different types of milling blanks which must be readily available for use can be relatively large. The manufacturer of the original milling blank typically supplies the blanks in a cardboard or plastic carton which includes packing material designed to protect each individual blank during shipment and storage.

When received at a dental office, the various mill blank cartons must be stored in some manner that permits their descriptive label to be readily observed. When a mill blank is needed, the dentist or a staff member must go the carton storage area, identify the correct carton, open the carton, carefully remove a mill blank, close the carton, replace the carton in its correct storage area and then take the blank to the automated milling machine. Insofar as the milling operation takes place while the patient is waiting in the dental office, there is some pressure to begin the milling operation as quickly as possible. The opportunity to incorrectly replace and store a partially used carton increases during a busy day, and increases dramatically once the dental office expands beyond a single practitioner or a single automated milling machine.

Presumably on any given day the number and type of procedures to be performed which will require the use of the milling machine are known, and patients have made appointments for the procedures at known dates and times. In that case the actual milling blanks to be used need to be removed from their cartons and displayed in some orderly fashion, rather than taken one by one to the automated milling machine immediately after removal from the carton.

Previous attempts have been made to store or display items in a useful manner. For example, U.S. Pat. No. 1,035,153, entitled "Display Sign", utilizes a covering 4 made of a plush material such as corduroy to secure buttons 7 by means of two pins 9. U.S. Pat. No. 1,452,242, entitled "Counter", discloses a series of inclined bins that may be viewed through a transparent glass window 23. The inclined bins hold bulk food items which are removed with a scoop. U.S. Pat. No. 2,333,717 entitled "Merchandising Rack", presents a scheme for the display, storage and merchandising control of greeting cards. U.S. Pat. No. 2,528,219 entitled "Method of Making Thermoplastic Articles", discloses a mold in which a series of metal teeth 1 are held in place on a base sprue 8 by a series of sprue shanks 2.

What is needed is an inventory control system that permits a wide variety of milling blanks to be readily located, accessed and immediately placed in a visible, accessible location indicating the order in which the blanks are intended for use in an automated milling machine. Further, a simple means must be provided for recording current inventory in real time as the milling blanks are removed from their cartons.

SUMMARY OF THE INVENTION

The present invention is an inventory control system that includes a cabinet that is typically installed on a wall or other vertical surface relatively near an automated milling machine that is typically found in a dental office. The present system provides a storage location for milling blanks as they are received from the original equipment manufacturer.

The present system includes a plurality of drawers that are housed in a wall mounted cabinet. Each drawer includes a rearward space that is shaped and sized to accommodate at least one container as received from the original mill blank manufacturer or distributor.

A forward portion of each drawer includes a series of openings that are each adapted to receive a single mandrel that is an integrally formed feature of each milling blank. The openings include a clamp mechanism that securely retains each mandrel within the opening, but which allows a milling blank to be readily removed without the use of tools. The clamp mechanism includes a spring that is biased to advance a sliding surface so as to abut the mandrel. The spring force is great enough to retain the mandrel, but is small enough to be overcome by manually urging the milling blank in an upward direction so as to remove the milling blank from the mandrel retaining opening.

The present invention creates an opportunity for a user of the system to observe the remaining milling blanks in the Original Equipment Manufacturer (OEM) container each time a milling blank is replaced in any of the blank retaining openings. The number of milling blanks remaining may then be easily recorded or the empty box may be removed to serve as a reminder that inventory has been depleted to a given level. In particular, each individual drawer, or row within the drawer, will typically be dedicated to a single type of milling blank. Further, each drawer will typically have the capacity to contain multiple OEM containers. As each empty box is removed, the approximate number of milling blanks remaining is apparent.

A label holder is incorporated into the front of each drawer in order to permit the system user to readily identify the type of milling blank contained within the drawer. The size of the cabinet may be selected to accommodate various numbers of drawers needed in any particular dental office. Multiple cabinets may be used simultaneously, permitting expansion or contraction to occur as needed, and to permit separation of cabinets that house substantially differing types of milling blanks based on size, color, material, mandrel style or other considerations.

DETAILED DESCRIPTION OF THE INVENTION

Figure 1:
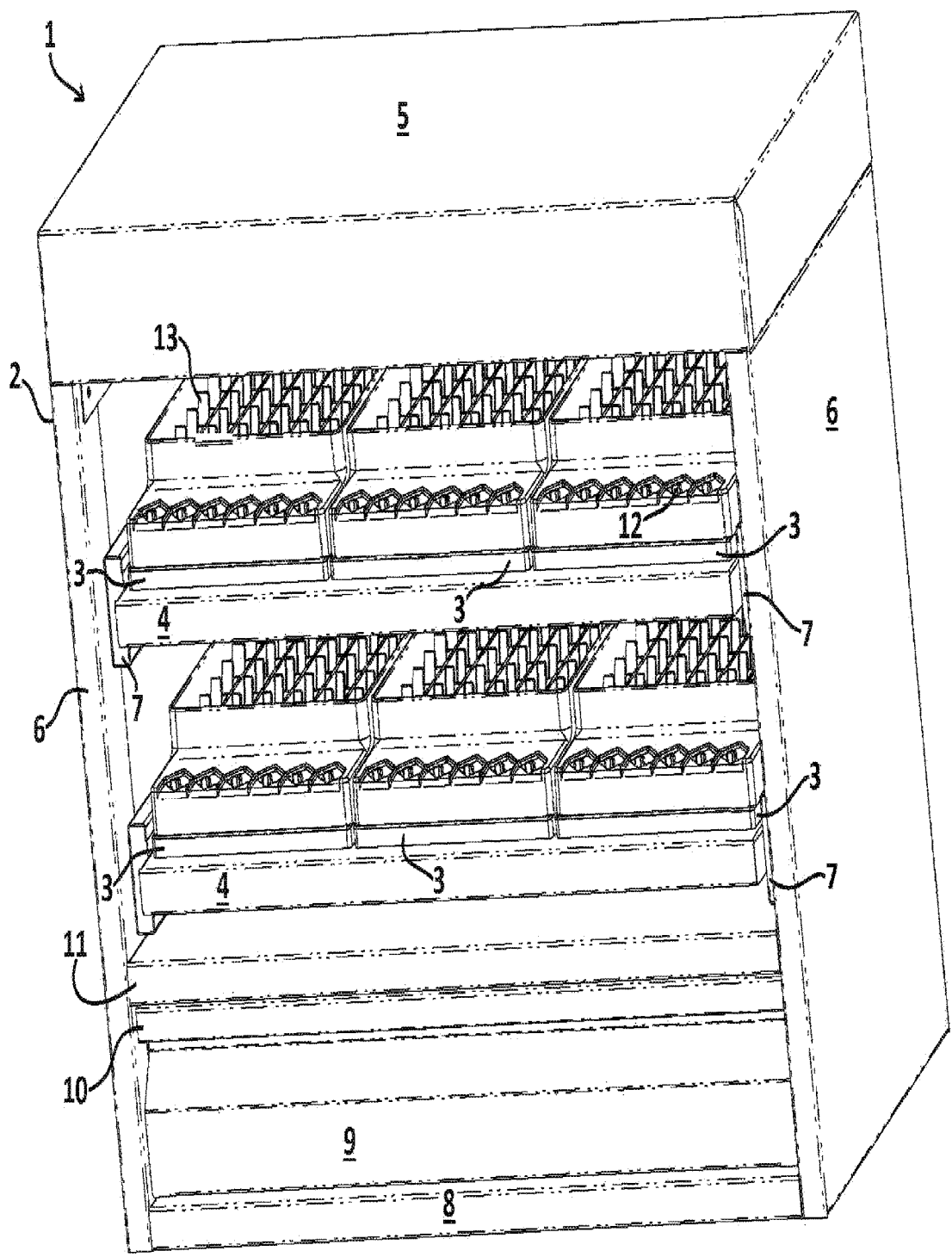
FIG. 1 is an isometric view of an inventory monitor constructed according to the principles of the present invention.

Referring to FIG. 1, an inventory monitor 1 constructed according to the principles of the present invention includes a cabinet 2 containing a plurality of trays or box assemblies 3. The boxes are arranged in rows, typically with a row of three boxes being supported by a shelf 4. A top cover 5 is mounted on side panels 6 which also serve as the mounting surface for a plurality of shelf support rails 7. A bottom panel 8 anchors the side panels 6 and also serves as a support for a drawer 9. The drawer includes an overhanging lip 10 that serves as the drawer handle. A drawer cover 11 is rigidly affixed to the side panels 6.

Figure 2:
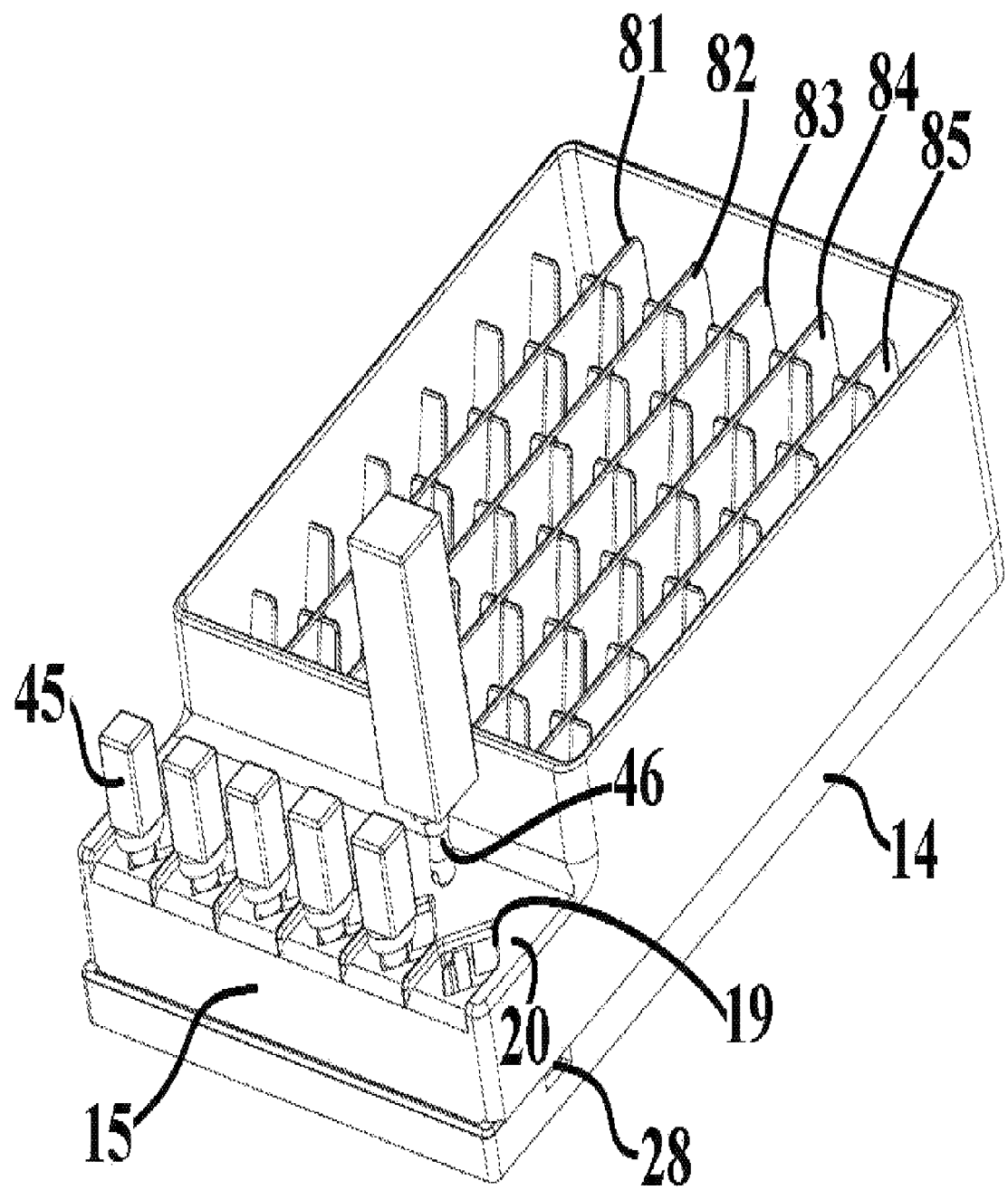
FIG. 2 is an isometric view of the box assembly that forms part of the inventory monitor depicted in FIG. 1, shown with mill blanks and an optional
Figure 3:
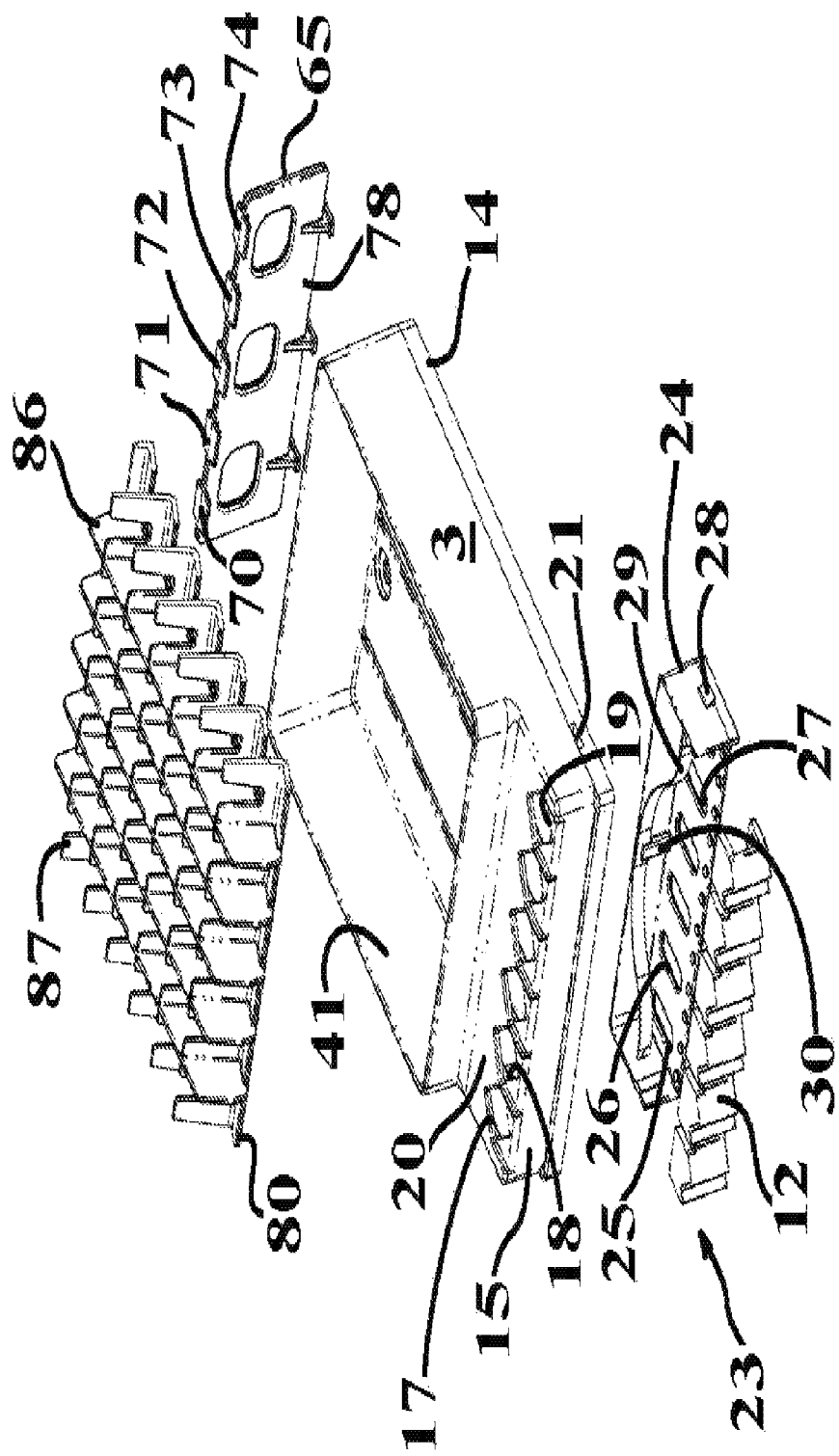
FIG. 3 is a first exploded isometric view of the box assembly that forms part of the inventory monitor depicted in FIG. 1.
Figure 4:
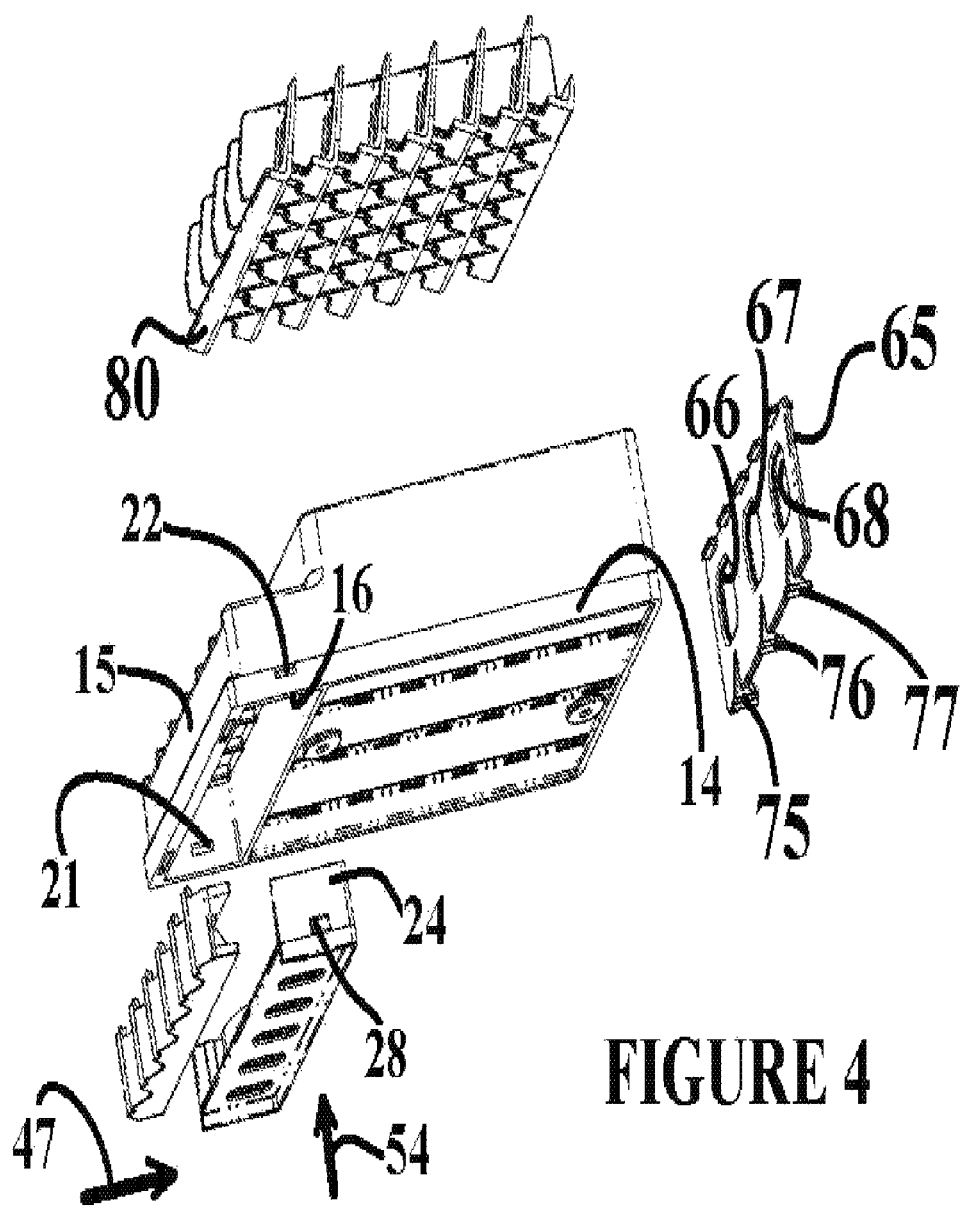
FIG. 4 is a second exploded isometric view of the box assembly that forms part of the inventory monitor depicted in FIG. 2.

Referring to FIGS. 2, 3, 4 and 5, the box 3 includes an integrally formed base 14 that includes a forward compartment 15 which is formed to include a lower cavity 16 (see FIG. 4). A series of generally square openings or bores such as, for example, openings 17, 18 and 19 pass through the top surface 20 of the forward compartment 15, thereby providing access to the lower cavity 16. The base 14 is formed to include a pair of opposed rectangular perforations 21 and 22.

As best seen in FIG. 3, a CAD/CAM blank retaining assembly 23 that may be placed within the lower cavity 16 is composed of three components. The first component is a center pad 24 which includes a plurality of spaced apart, elongated perforations or openings, such as, for example, perforations 25, 26 and 27. Each perforation is generally aligned with one of the generally square openings formed in the forward compartment 15. For example, opening 17 is vertically aligned with perforation 25, opening 18 is vertically aligned with perforation 26 and opening 19 is vertically aligned with perforation 27. The center pad 24 is formed to include two tabs, including tab 28 that extends outwardly from the center pad 24 so as to be aligned with the opposed rectangular perforation 21 of box 3.

Figure 6:
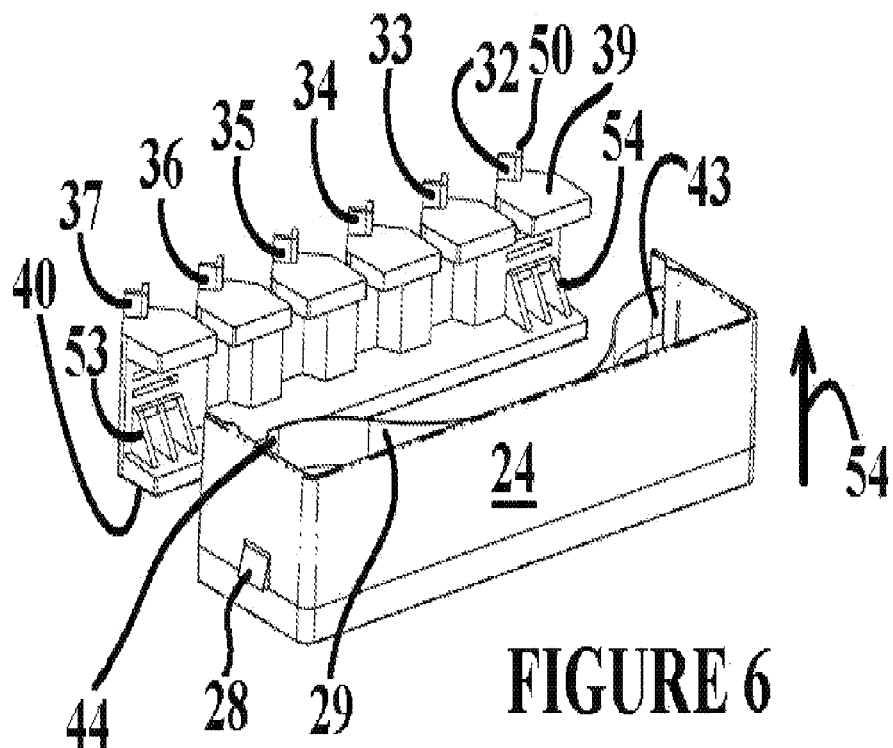
FIG. 6 is a first exploded isometric view showing only the support block, spring and center pad components depicted in FIG. 2.
Figure 7:
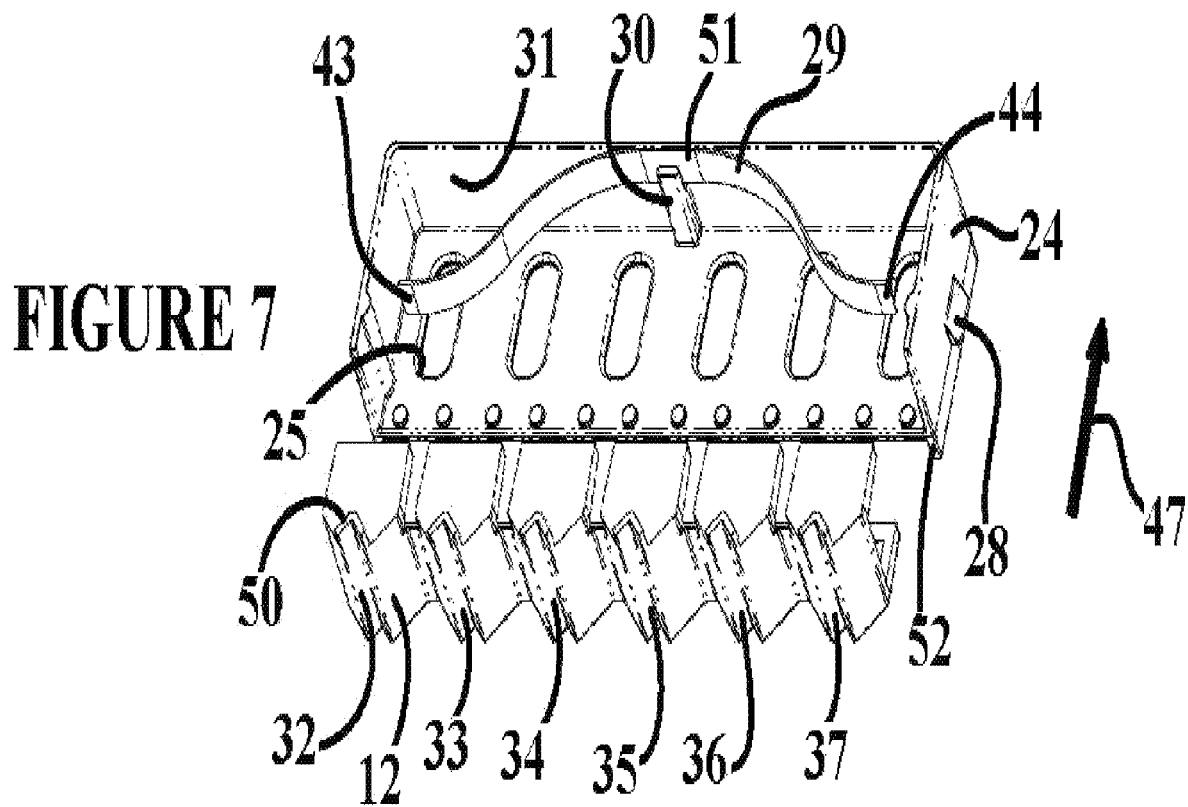
FIG. 7 is a second exploded isometric view showing only the support block, spring and center pad components depicted in FIG. 2.

As best seen in FIGS. 6 and 7, the second component of the mill blank retaining assembly 23 is a spring 29, which is mounted behind a cantilevered tab 30 that is formed integrally on the planar back wall 31 of center pad 24. The spring 29 is formed to include opposite end pieces 43 and 44 that are biased to resist any force acting in the direction of arrow 47, such a force component tending to urge the entire spring 29 to reside within a plane that is parallel to the planar back wall 31.

The third component of the mill blank retaining assembly 23 is the retaining block 12, which is adapted to secure an irregularly shaped spindle or shaft, such as the spindle 46 that typically extends from a dental mill blank 45. The retaining block 12 is adapted to slide into the center pad 24 by moving in the direction of arrow 47. The retaining block 12 includes a plurality of generally vertical substantially orthogonal grooves 32, 33, 34, 35, 36 and 37. The generally planar upper top surface 39 and the planar bottom surface 40 of the support block 12 are substantially parallel. The top edge of each of the orthogonal grooves 32-37, such as the top edge 50 of orthogonal groove 32, extends slightly above the planar top surface 39.

The completed mill blank retaining assembly 23 is created by first placing the central region 51 of spring 29 into the cantilevered tab 30 that resides on the back wall 31 of center pad 24. The support block 12 is then advanced in the direction of the arrow 47 so that the entire support block 12 travels beyond the leading edge 52 of the center pad 24. A pair of ramps 53 and 54 are formed at ends of support block 12 to engage and guide the ends 44 and 43, respectively, of the spring 29 into a position below the block top surface 39, thereby causing spring 29 to assume a substantially horizontal orientation. As best seen in FIG. 4, by securing, manually or otherwise, the support block 12 within center pad 24, the entire retaining assembly 23 is lifted or pushed in the direction of arrow 54 so as to reside within the cavity 16. The opposite tabs of center pad 24, such as tab 28, then lock into the adjacent perforation, such as perforation 22, thereby permanently securing the retaining assembly 23 into the cavity 16.

Figure 5:
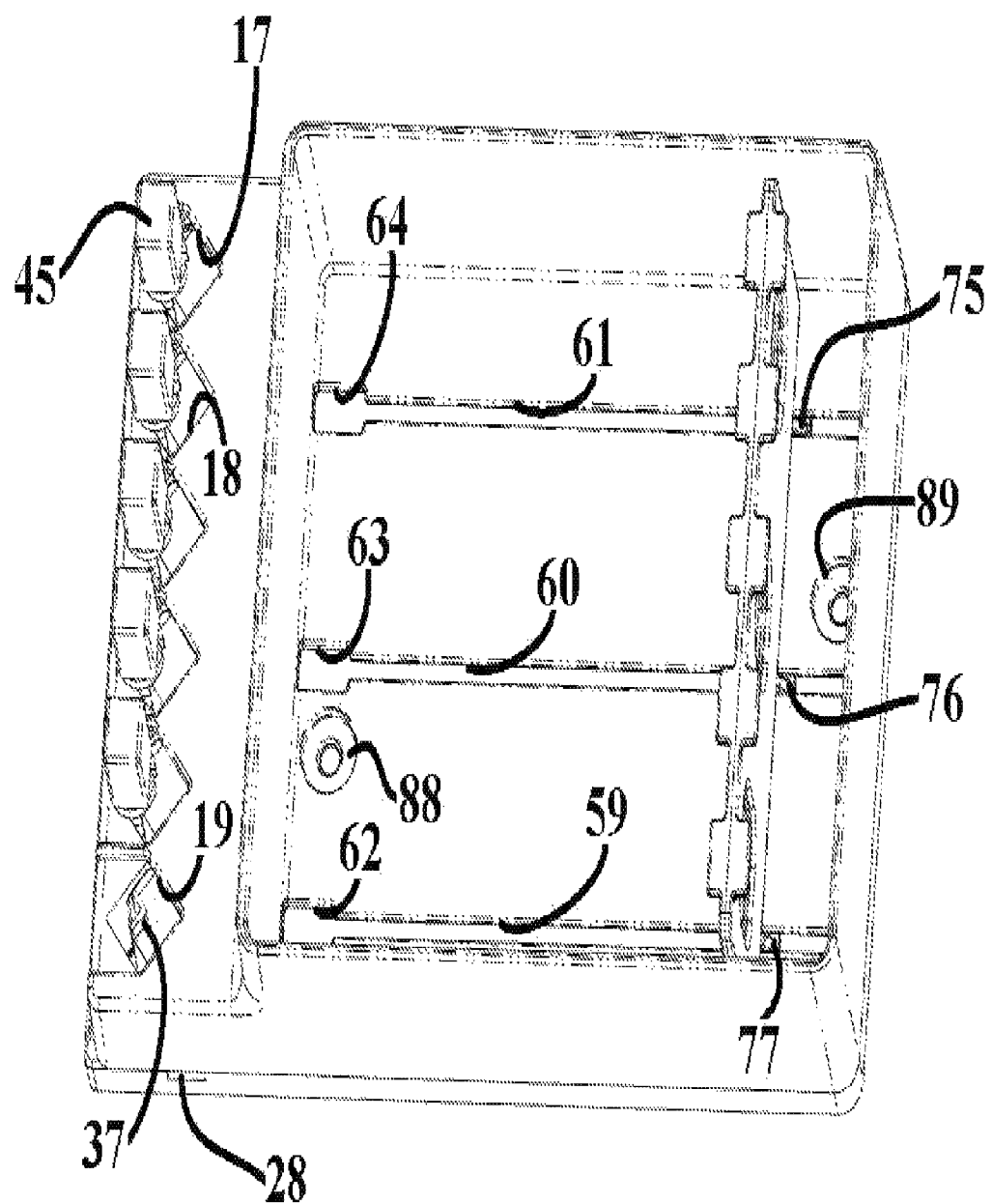
FIG. 5 is a top perspective view of the box assembly depicted in FIG. 4.
Figure 9:
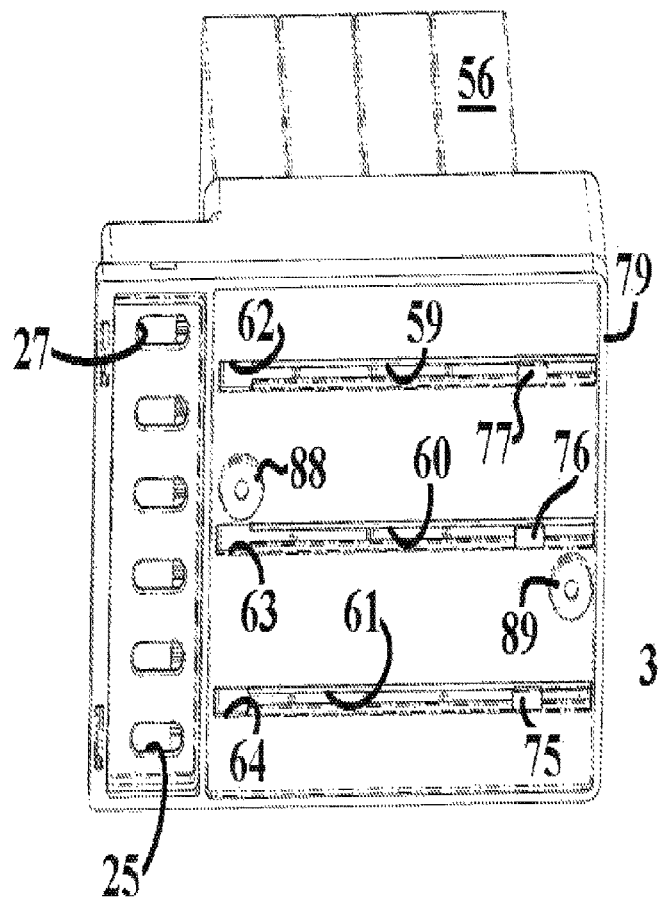
FIG. 9 is a fourth isometric view of the box assembly depicted in FIG. 8, shown with the rack component mounted within the box assembly.
Figure 8:
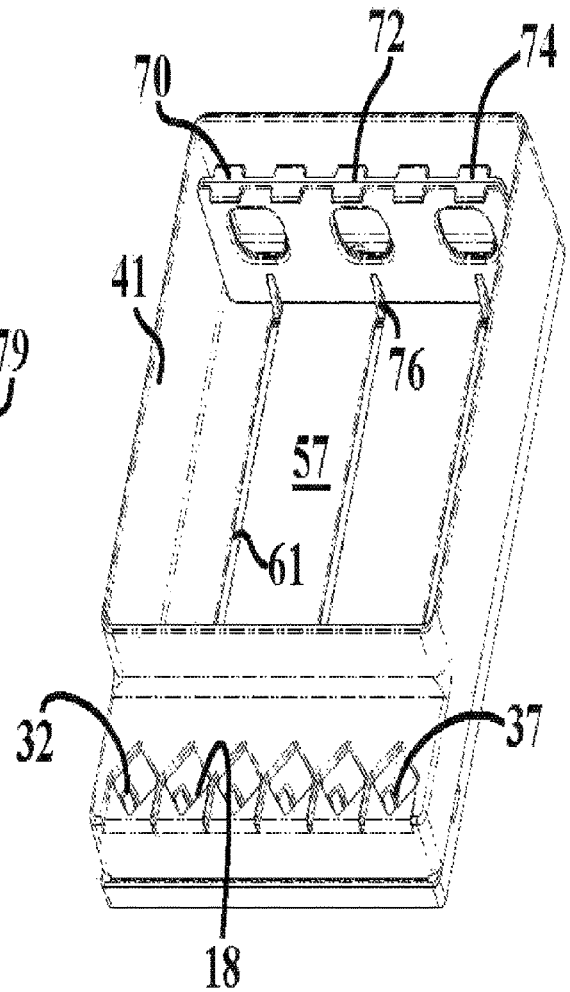
FIG. 8 is a third isometric view of the box assembly depicted in FIG. 7.

In addition to securing the mill blanks 45 in the lower forward compartment 15, the drawer or box 3 includes an upper or rearward compartment 41 which is capable of storing additional blanks which are queued for future use. The blanks 45 are typically shipped in cardboard containers 56 which may be placed directly on the bottom surface 57 of the box 3. As best seen in FIGS. 5, 8 and 9, the bottom surface 57 is formed to include three parallel grooves 59, 60 and 61 which extend for substantially the entire length of the rearward compartment 41. The forward portion of each groove includes an enlarged region 62, 63 and 64, respectively, the remainder, approximately ninety percent, of each groove is relatively narrow. The grooves are intended to accommodate a slide 65. A pair of recessed openings 88 and 89 are included to allow releasable fasteners to engage the shelf 4 when affixing the box 3 to shelf 4.

As seen in FIGS. 3, 4, 5 and 8, the slide 65 is formed as a generally planar structure including three square openings 66, 67 and 68. Along the top edge 69 of the slide 65 are a series of generally rectangular tabs 70, 71, 72, 73 and 74 with are substantially orthogonal to the plane formed by the slide. A series of supports 75, 76 and 77 are formed along the bottom edge 78 of the slide, each support being aligned with one of the grooves existing in the bottom 57 of the rearward compartment 41. In use, the slide is 65 is mounted within the grooves 59, 60 and 61 and the slide is moved toward the rear wall 79 of compartment 41. One or more blank containers 56 are placed on the bottom 57 and the slide is advanced toward the forward compartment 15 until the one or more of the tabs 70, 71, 72, 73 and 74 abut the surface of the rearmost container 56. The tabs are well above the centroid of the slide 65, and the force of the container 56 against the tabs causes the slide to tilt rearwardly. The rearward tilt of the slide 65 causes the bottom supports 75, 76 and 77 to press against the bottom of 57 of the rearward compartment 41, thereby holding the slide in a stationary position and preventing rearward movement of the container 56.

As best seen in FIGS. 2, 3 and 4, a rack 80 may be placed on the bottom surface 57 of the rearward compartment 41 instead of the slide 65. The rack 80 is formed as series of parallel sidewalls or partitions 81, 82, 83, 84 and 85. Rows of tilted easels, such as easels 86 and 87, reside between the sidewalls, thereby creating a plurality of compartments suitably dimensioned to retain an individual CAD/CAM milling blank. A single blank may be placed on each easel, typically with the spindle facing upwardly to facilitate placement and removal.

While illustrative examples of this invention have been described in detail, this novel system may be embodied in other specific forms without departing from the scope of the claimed invention.

I claim:

1. An inventory control system comprising:
   (a) a storage cabinet; and
   (b) a plurality of drawers, each drawer being mounted within the cabinet, each drawer further comprising;
      (i) a substantially horizontal storage area;
      (ii) a forward platform, the platform being formed integrally with and adjacent to the substantially horizontal storage area, the forward platform further comprising:
         (A) an upper surface;
         (B) a lower surface;
         (C) a plurality of bores arranged in a spaced apart relationship; and
         (D) a cavity residing below the lower surface, each of the plurality of bores creating an access path from the upper surface into cavity;
   (c) a retaining block, the retaining block residing within the cavity, the retaining block being adapted to grip an object extending from the top surface into the cavity through one of the plurality of bores; and
   (d) a center pad, the center pad being mounted within the cavity, the center pad comprising:
      (i) a generally planar bottom surface, the planar bottom surface being formed to include a plurality of elongated openings wherein each elongated opening is vertically aligned with one of the plurality of bores formed within the forward platform, each of the elongated openings being adapted to receive a portion of an object being gripped by the retaining block;
      (ii) a substantially vertical back wall; and
      (iii) a cantilevered vertical tab, the cantilevered vertical tab being integrally formed with and being anchored to the substantially vertical back wall.

2. The inventory control system of claim 1, further comprising a spring, the spring being secured by the cantilevered vertical tab of the center pad, the spring being adapted to urge the retaining block away from the substantially vertical back wall of the center pad.

3. The inventory control system of claim 2, wherein the retaining block further comprises:
   (a) a plurality of adjacent columns, each column being substantially hollow, each column further comprising:
      (i) an upper surface;
      (ii) a lower surface;
      (iii) a left sidewall;
      (iv) a right sidewall, the right sidewall intersecting the left sidewall, thereby forming an intersection; and
   (b) a substantially vertical orthogonal groove; the orthogonal groove being formed at the intersection of the left sidewall and the right sidewall, the orthogonal groove being biased by the spring to abut an object extending from the top surface into the cavity via one of the plurality of bores.

4. The inventory control system of claim 3, wherein each of the plurality of drawers further comprises:
   (a) a substantially planar bottom surface;
   (b) a pair of integrally formed parallel sidewalls, the planar bottom surface being integrally formed with and residing between the pair of integrally formed parallel sidewalls; and
   (c) a plurality of longitudinally extending grooves formed within the planar bottom surface, the longitudinally extending grooves being substantially parallel to the parallel sidewalls.

5. The inventory control system of claim 4, further comprising a slide, the slide being adapted to be slidably retained within the plurality of longitudinally extending grooves so as to retain an object placed on the substantially planar bottom surface of a drawer.

6. The inventory control system of claim 4, further comprising a rack, the rack residing within the substantially horizontal storage area of one of the plurality of drawers, the rack comprising:
   (a) a plurality of inclined supports arranged in rows and columns; and
   (b) a plurality of sidewalls extending vertically between adjacent inclined supports so as to create a region that is suitably dimensioned to retain an object residing within the region.

7. The inventory control system of claim 5, wherein the slide further comprises:
   (a) a substantially planar rectangular plate having a top edge and a bottom edge;
   (b) a plurality of bottom supports residing on the bottom edge of the rectangular plate, each bottom support being adapted to be slidably retained within one of the longitudinally extending grooves formed in the planar bottom surface of the drawer; and
   (c) a plurality of spacer tabs residing on the top edge of the rectangular plate, each tab extending orthogonally from the rectangular plate so as to abut an object placed on the substantially planar bottom surface of a drawer.

8. The inventory control system of claim 4, wherein the storage cabinet further comprises:
   (a) at least one substantially horizontal shelf, the horizontal shelf having a front panel;
   (b) a pair of opposed side panels that define a width of the storage cabinet, the horizontal shelf being rigidly affixed to each of the pair of opposed side panels; and
   (c) a relatively thin groove, the relatively thin groove being integrally formed in the front panel of the horizontal shelf, the relatively thin groove being adapted to retain a label removed from packaging associated with an object stored in an adjacent drawer.

9. The inventory control system of claim 8, wherein each of the longitudinally extending grooves formed within the bottom surface of each drawer comprises:
   (a) a relatively enlarged first end region, the relatively enlarged first end region being adapted to a receive bottom support residing on the bottom edge of the rectangular plate of the slide; and (b) a relatively narrow remaining region, the remaining region being at least ninety percent of a total length of each longitudinally extending groove, the relatively narrow remaining region being adapted to prevent removal of the slide from each longitudinally extending groove.

\* \* \* \* \*